E. B. BEDDARD.
BALL BEARING EXTRACTOR.
APPLICATION FILED NOV. 12, 1917.
1,289,611.
Patented Dec. 31, 1918.
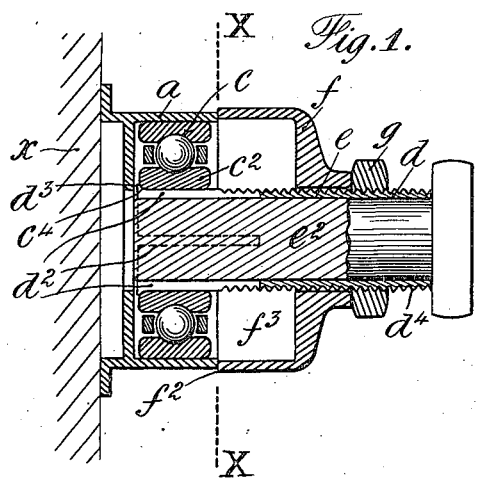
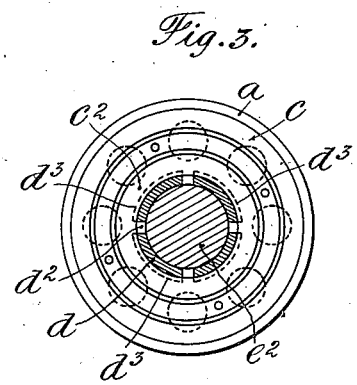
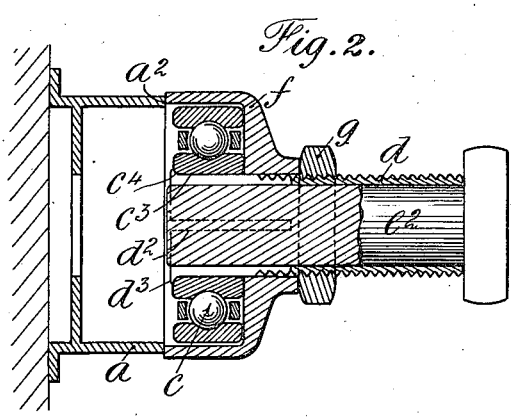
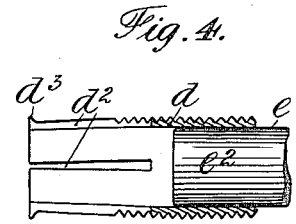
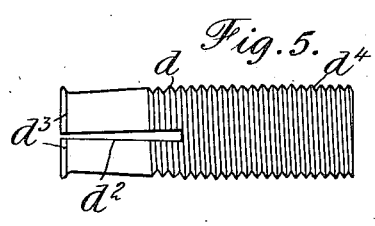
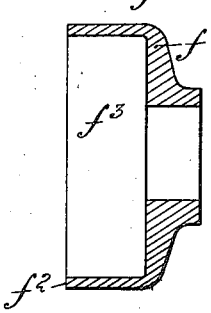
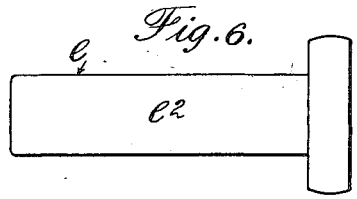
Inventor
Edgar Brookes Beddard
by
James L. Norris
Attorney

UNITED STATES PATENT OFFICE.

EDGAR BROOKES BEDDARD, OF WOLVERHAMPTON, ENGLAND.

BALL-BEARING EXTRACTOR.

1,289,611.　　　　　Specification of Letters Patent.　　Patented Dec. 31, 1918.

Application filed November 12, 1917.　Serial No. 201,632.

*To all whom it may concern:*

Be it known that I, EDGAR BROOKES BEDDARD, subject of the King of Great Britain, residing at 9 Poplar street, Blakenhall, Wolverhampton, in the county of Staffs, England, have invented certain new and useful Improvements in Ball-Bearing Extractors, of which the following is a specification.

The invention relates to ball bearings of the "Hoffman" type driven into housings or sockets a tight fit, and provides a simple and effective extractor for quickly removing said bearings from said housings or sockets.

In such a type of bearing the bore of the inner ring has rounded edges, and usually when applying such a bearing to a socket by tightly driving it into said socket said bearing fits close up to the bottom of the socket, which sometimes has a small diameter hole through its bottom for lubrication, etc., and at other times has a blind end or bottom.

The invention relates solely to this type of bearing, and is distinctive by providing a construction of extractor which utilizes for its extracting engagement with the bearing one of the rounded edges only of the bore of the inner ring, so that the inner end of the extractor when engaging the ball bearing comes practically flush with the inner face or side of the bearing and can be applied for extraction to a socket with a blind bottom. Forming part of the extractor is an expansible sleeve to tightly fit the bore of the inner ring of the bearing and having formed upon it at the extremity of its engaging end minute diametric projections shaped to the counter-part of the rounded edge of the inner ring's bore, which projections extend only to the depth of the rounded edge. A push-in plug is adapted to expand the sleeve in such manner that the latter tightly engages the whole of the bore of the inner ring and the projections the rounded edge, and completely diametrically fills the sleeve at such engaging parts, so that it is not possible for the curved projections to disengage the rounded edge however small in amount the engagement may be.

Screw devices traverse the sleeve while the plug is expanding it to withdraw the bearing from the socket or housing, and operate against a hollow bell-shaped abutment applied over the sleeve to contact the front edge of the housing.

The invention is represented by the accompanying drawings.

Figure 1 is an axial section of the combined housing, bearing, and extractor, the latter in position ready for forcibly extracting the bearing from the housing.

Fig. 2 is a similar section to Fig. 1 showing the bearing extracted.

Fig. 3 is a section of Fig. 1 on the dotted lines X X.

Fig. 4 is a section of a portion of the sleeve partly engaged by the plug.

Fig. 5 is an elevation of the sleeve separate.

Fig. 6 is an elevation of the plug separate.

Fig. 7 is a section of the abutment piece separate.

The housing $a$ is of usual construction secured in any ordinary manner to a supporting wall $x$. The ball bearing $c$ is of the "Hoffman" type and is driven into the bore of the housing $a$ tight fit in the usual way, the invention providing an extractor for removing this bearing from the housing when desired.

For the purpose of the invention it is only necessary to refer to the inner ring $c^2$ of the bearing and to the rounded edge $c^4$ of the bore $c^3$ of this inner ring.

$d$ is a metal sleeve made expansible at and for a distance from its one end by the longitudinal slittings $d^2$, the expansible portion normally tapering and the extreme end being provided with integral diametric circular projections $d^3$ shaped to closely follow the rounded edge $c^4$ of the inner ring $c^2$ of the bearing. The greater part of this sleeve is externally screw-threaded as shown at $d^4$. The expansible end of this sleeve is adapted for pushing into the bore $c^3$ of the inner ring $c^2$ by hand, while said sleeve is contracted as shown in Figs. 4 and 5, to a position placing the projections $d^3$ opposite the rounded edge $c^4$ after which said sleeve is expanded within the bore of the inner ring $c^2$ in the manner represented by Figs. 1 and 2 by the insertion into said sleeve of a push-in plug $e$ which has a parallel portion $e^2$ to fit the bore of the sleeve. This expansion of the sleeve causes the projections $d^3$ to closely engage the rounded edge $c^4$ and so long as the plug $e$ is in position there is a positive engagement between the sleeve and the ring $c^2$ in a direction pulling out the ball bearing $c$ from the housing $a$. Fig. 4 shows how the plug enters the sleeve and Fig. 2 shows by the cross section how the circular projections engage behind the rounded edge $c^4$ on the plug being forced fully home.

$f$ is a bell-like abutment piece adapted to slide over the sleeve $d$ a good fit and at its forward annular edge $f^2$ to bear against the front edge $a^2$ of the annular wall of the housing $a$. The interior of this bell-shaped abutment piece at $f^3$ will freely accommodate the ball bearing $c$ when removed from the housing, as shown in Fig. 2.

A rotatable screw nut $g$ works on the screw-threaded portion $d^4$ of the sleeve between the abutment piece $f$ and the outer end of said sleeve and is the hand operated power device used for forcibly extracting the bearing $c$ against the housing as a stop.

The diametric projections $d^3$ need only be of such a size as to practically fill in square the corner of the rounded edge $c^4$ of the inner ring $c^2$, this together with the tight contact of the sleeve with the bore being a sufficient positive engagement between the sleeve and the ball bearing for effective extraction.

The sleeve $d$ is first pushed into the bore of the bearing $c$ while the abutment piece $f$ and screw nut $g$ are rearward of their normal positions, after which the plug $e$ is inserted fully home into said sleeve to expand the latter's inner end and maintain said expansion which insures a positive engagement of the sleeve with the inner ring $c^2$. The abutment piece $f$ is then brought up to its proper position against the edge $a^2$ of the housing and the screw nut up to its proper position against the abutment piece, after which by rotating the screw nut against the abutment piece the sleeve $d$ together with the plug $e$ and the ball bearing $c$ are drawn outwardly to efficiently extract the ball bearing from the housing.

Each extractor is made for a certain size of ball bearing and will not only extract the particular size but will do this quite irrespective of whether the housing is a blind socket (not shown) or a tubular socket as shown.

Having now described my invention what I claim and desire to secure by Letters Patent is:—

An extractor for forcibly removing a ball bearing from its housing or socket consisting of an expansible sleeve having a normally tapered reduced bearing entrance extremity with an exterior smooth surface and the remaining surface screw threaded fully to the rear end of the sleeve, the reduced entrance extremity of the sleeve being longitudinally slotted and the free end of said extremity formed with an outwardly curved inclined projection, a push plug of equal diameter through its length and of greater diameter than the normally tapered reduced bearing entrance extremity, the said plug having a head at one end, the plug being inserted in the sleeve to expand the normally reduced extremity of said sleeve into a tight grip with the portion of the ball bearing which it is adapted to engage, an abutment piece in which the sleeve is mounted to slide, said abutment piece having an annular edge to bear against the housing of the bearing, and a nut on the screw threaded portion of the sleeve to engage the abutment piece.

In testimony whereof I have hereunto set my hand in presence of two subscribing witnesses.

EDGAR BROOKES BEDDARD.

Witnesses:
 GEO. T. FUERY,
 D. LEAKER.